FIG. 1

INVENTORS
EZRA E. THEYS
HUGH B. MORSE

Nov. 9, 1971     E. E. THEYS ET AL     3,618,480
APPARATUS AND METHOD FOR CLOSING AND SEALING CARTONS
Filed June 12, 1970     9 Sheets-Sheet 2

INVENTORS
EZRA E. THEYS
HUGH B. MORSE

INVENTORS
EZRA E. THEYS
HUGH B. MORSE

INVENTORS
EZRA E. THEYS
HUGH B. MORSE

FIG. 13

INVENTORS
EZRA E. THEYS
HUGH B. MORSE

INVENTORS
EZRA E. THEYS
HUGH B. MORSE

Nov. 9, 1971  E. E. THEYS ET AL  3,618,480

APPARATUS AND METHOD FOR CLOSING AND SEALING CARTONS

Filed June 12, 1970  9 Sheets-Sheet 8

INVENTORS
EZRA E. THEYS
HUGH B. MORSE

United States Patent Office 3,618,480
Patented Nov. 9, 1971

3,618,480
APPARATUS AND METHOD FOR CLOSING AND SEALING CARTONS
Ezra E. Theys, San Mateo, and Hugh B. Morse, San Jose, Calif., assignors to Fibreboard Corporation, San Francisco, Calif.
Original application Feb. 17, 1969, Ser. No. 799,783, now Patent No. 3,587,411. Divided and this application June 12, 1970, Ser. No. 57,863
Int. Cl. B31b 1/04, 1/54, 3/26
U.S. Cl. 93—49 R          4 Claims

ABSTRACT OF THE DISCLOSURE

An apparatus comprises folding and sealing stations for progressively folding adhesively treated carton flaps into superimposed relationship and for sealing the flaps together. The folding may be occasioned by a horizontally disposed tucker wheel positioned on each side of the carton for folding three minor flaps and a plow bar for folding a cover flap over the afore-mentioned minor flaps. The carton is then conveyed to the sealing station whereat a nozzle means moves along with the carton to discharge heated air onto juxtaposed portions of the carton flaps. Means are then provided for compressing the flaps together. A second embodiment incorporates the nozzle means into the tucker wheel to perform the folding and sealing steps substantially simultaneously.

---

This is a division of application Ser. No. 799,783, filed on Feb. 17, 1969, now U.S. Pat. No. 3,587,411, issued June 28, 1971.

The popularity of frozen food packaging dictates the need for apparatus and methods whereby the closure flaps of cartons may be folded and sealed expeditiously and economically. The availability of heat sealable adhesives or coatings, such as polyethylene, has encouraged the packaging art to employ heated air for expeditiously activating such adhesive prior to sealing. For example, U.S. Pat. No. 3,389,645, assigned to the assignee of this application, discloses an apparatus and method employing heated air for carton sealing purposes.

In general, packaging speeds are dictated by the ability of a machine to efficiently fold and tightly seal a carton's closure flaps without distorting, scarring or otherwise impairing the carton's appearance or structural integrity. Folding and sealing problems are particularly apparent with respect to the so-called top loaded frozen food cartons which may comprise relatively lengthy but narrow flaps which are more readily prone to leakage than conventional flaps. It has been found that the apparatus and method of this invention is capable of efficiently folding and sealing carton closure flaps at speeds substantially higher than packaging speeds achieved by conventional apparatus and methods.

General objects of this invention are to provide an apparatus and method for expeditiously and economically folding and sealing adhesively treated portions of carton flaps together. This invention is particularly useful for forming a carton closure exhibiting high structural integrity and leakage resistance. The apparatus comprises conveying means for moving a carton through a folding means to fold and juxtapose at least two carton flaps. Nozzle means are movably mounted in the apparatus for discharging a heated fluid onto the flaps. Flap closing means are positioned for thereafter compressing and sealing the flaps together.

The folding means of a first described embodiment comprises at least one tucker wheel rotatably mounted adjacent to the conveying means. The nozzle means is mounted in the apparatus to move in the general direction of the conveying means for simultaneously discharging the heated fluid, preferably air, onto the folded carton flaps. A second described embodiment incorporates a nozzle means into at least one tucker wheel to thus perform the folding and sealing operations at the same location in the apparatus.

Other objects of this invention will become apparent from the following description and accompanying drawings wherein.

Figure 1:
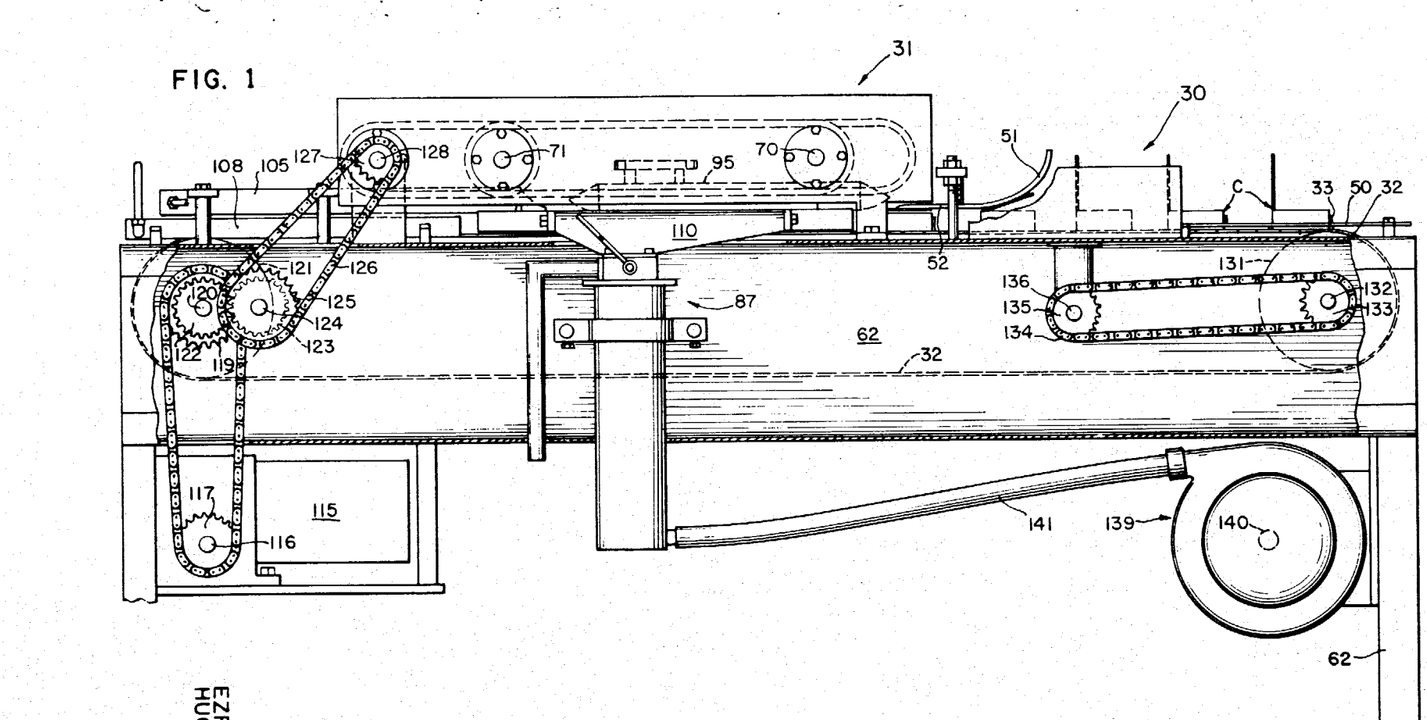
FIG. 1 is a side elevational view of an apparatus employing novel features of this invention therein with parts broken-away for clarification purposes.
Figures 2, 3:
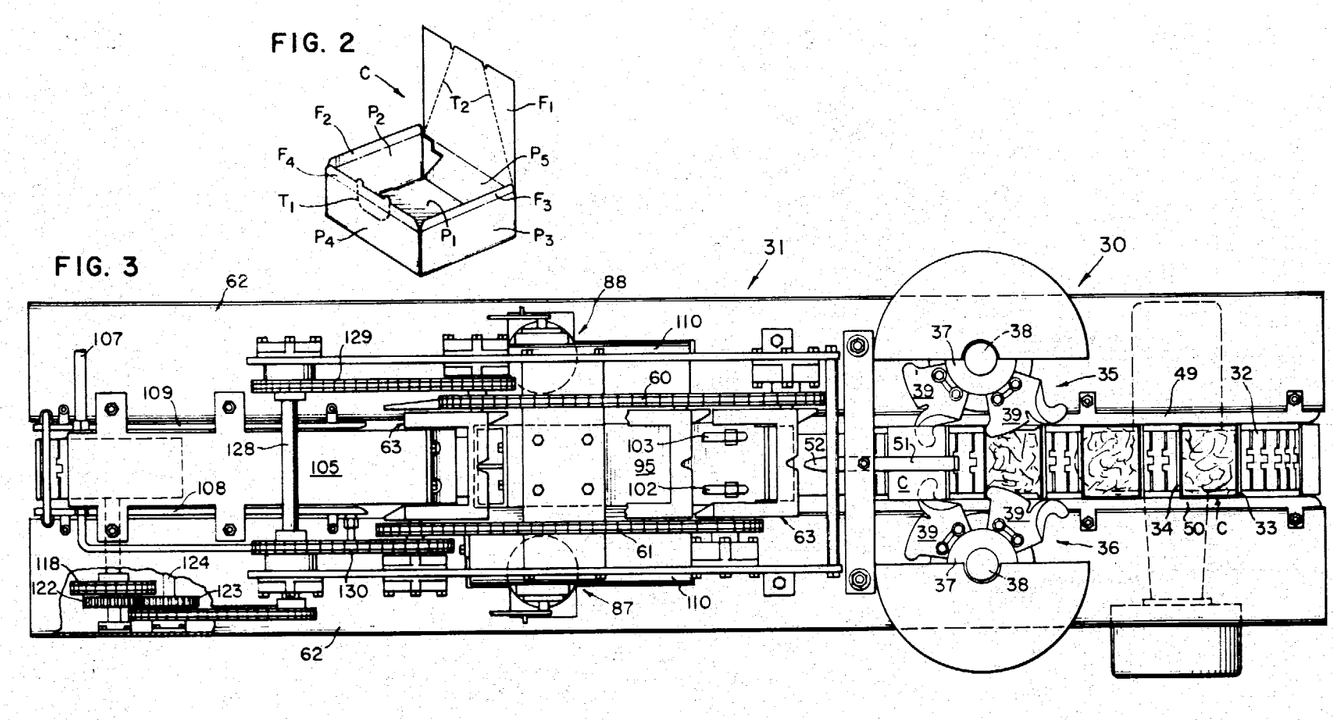
FIG. 2 is an isometric view of a partially erected carton adapted to have closure flaps thereof closed and sealed pursuant to teachings of this invention.
FIG. 3 is a top plan view of the FIG. 1 apparatus with parts broken-away for clarification purposes.

Referring to FIGS. 1 and 3, the illustrated apparatus comprises a folding station or means 30 and a sealing station or means 31 adapted to have cartons C continuously conveyed therethrough by conveying means, preferably in the form of an endless conveyor belt 32. The conveying means functions to retain and move the cartons along a path or line of flight during all phases of the folding and sealing operations. The drive means therefor will be hereinafter described during the course of describing the integrated, overall drive system for the apparatus. It should be understood that the term path may be interpreted to mean a path other than the straight and horizontal one illustrated, e.g., vertical, arcuate, etc.

The illustrated carton is of the top loading type comprising a single blank suitably cut and scored and partially erected to its FIG. 2 condition. The partially erected carton may comprise a horizontally disposed bottom panel $P_1$ having vertically disposed side panels $P_2$ and $P_3$ and front and rear panels $P_4$ and $P_5$, respectively, connected thereto. A cover flap or top panel $F_1$ is hingedly connected at a scoreline to the top edge of rear panel $P_5$ whereas vertically disposed minor flaps $F_2$, $F_3$ and $F_4$ are connected in a similar manner to panels $P_2$, $P_3$ and $P_4$, respectively. A tear line $T_1$ may be formed in front panel $P_4$ and flap $F_4$ to define a removable tab adapted to tear open top flap $F_1$ at tear lines $T_2$ after the top flap has been secured to minor flaps $F_2$–$F_4$ to form a closed carton.

Each carton is delivered to and trapped between upstanding lugs or plates 33 and 34 secured to conveyor 32 (FIGS. 1 and 3). It should be noted in FIG. 7, for example, that lug 34 preferably has a height substantially equal to the height of front panel $P_4$. The lug thus provides back-up means to aid in preventing the panel and attached flap $F_4$ from buckling or otherwise distorting during subsequent folding and sealing operations. It should be further noted that lug 33 may comprise a height substantially less than the height of lug 34 since such distortion problem is not apparent thereat.

Folding assemblies 35 and 36 are each mounted on a respective side of the conveying means to first fold flaps $F_2$ and $F_3$ to a horizontally disposed position and to then fold flap $F_4$ thereover. Since the folding assemblies are substantially identical, only assembly 36 will be described in detail with particular reference being afforded to FIGS. 4–12. The folding assembly comprises a horizontally disposed tucker means or wheel 37 secured to a vertically disposed shaft 38 to rotate therewith.

The tucker wheel comprises a plurality of folding members 39, each member being adjustably mounted on the periphery of the wheel by an arcuate slot and bolt connection 40. Thus, each folding member may be adjusted about the longitudinal axis of shaft 38 to adjust the assembly for the folding of carton flaps having varied dimensions. Although four folding members are employed on the illustrated tucker wheel, any desired number thereof may be employed depending on the particular packaging application under consideration.

The tucker wheels function to gradually engage and fold flaps $F_2$–$F_4$ by having portions thereof move substantially in the direction of the scoreline hingedly connecting each flap to the carton. Such gradual folding prevents the cartons side panels $P_2$–$P_4$ (FIG. 2) from buckling or otherwise distorting. In addition, such portions function to gently push the produuct (not shown) towards the center of the carton. The linear or surface speed at the folding portions of each tucker wheel are preferably substantially equal to the linear speed of the conveying means to alleviate carton drag.

Figure 4:
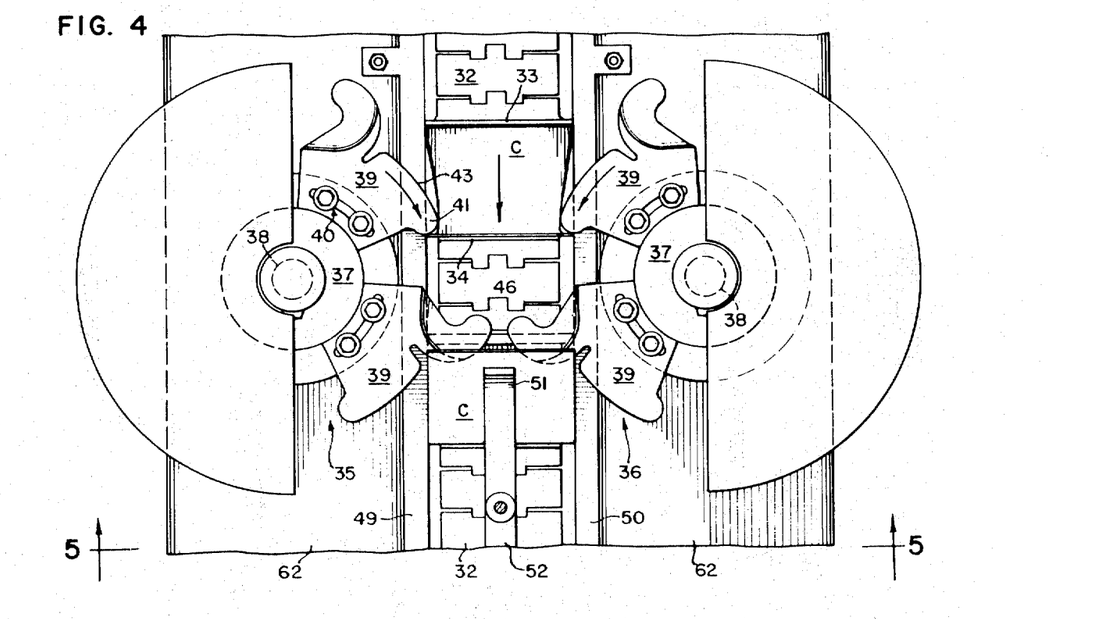
FIG. 4 is an enlarged, top plan view of a folding station employed in the FIGS. 1 and 3 apparatus.
Figure 5:
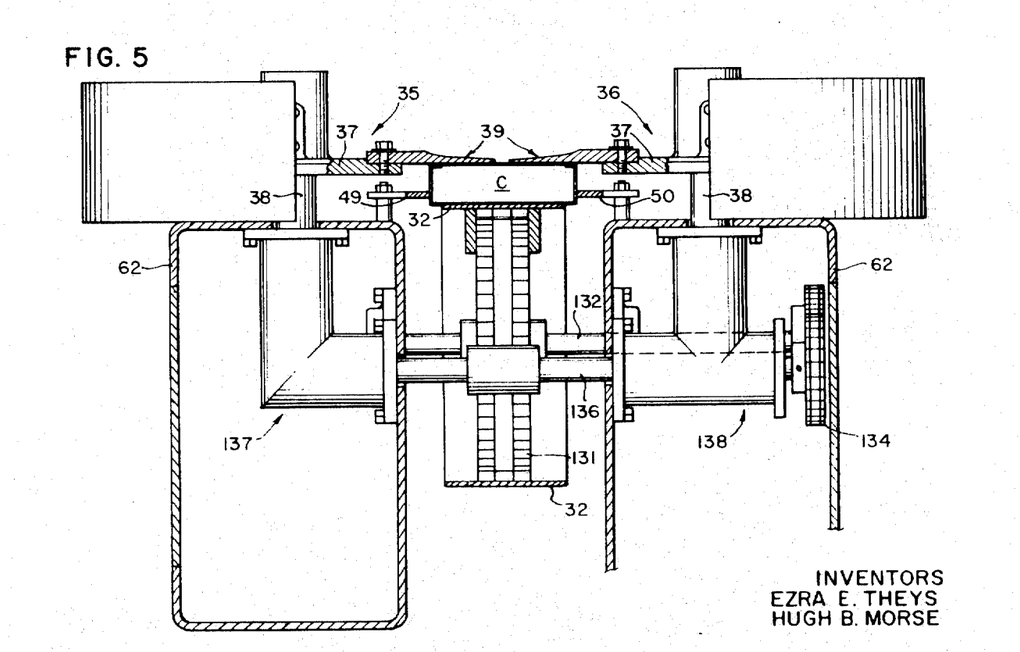
FIG. 5 is a partially sectioned, front elevational view of the folding station taken in the direction of arrows 5—5 in FIG. 4.
Figures 6, 7, 8, 12:
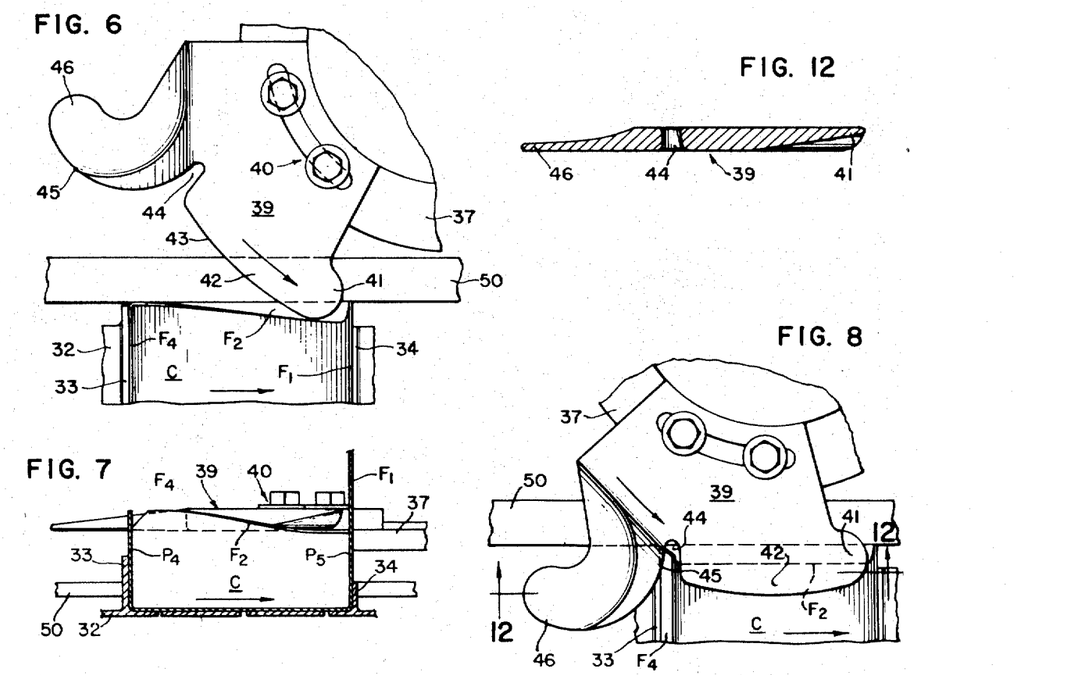
FIGS. 6-11 are enlarged, fragmentary views of a tucker wheel employed in the folding station illustrating the tucker wheel in progressive states of operation.
FIG. 12 is a sectional view of a portion of the tucker wheel.
Figures 9, 10:
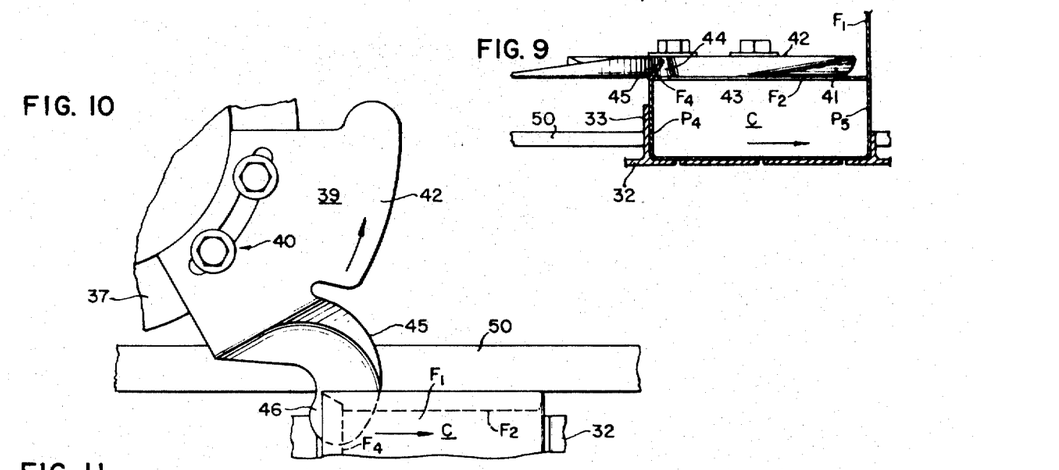

Referring to FIG. 6, the folding member comprises a rounded, leading first finger means or portion 41 connected to an arcuate portion 42. Edge 43 of portion 42 preferably comprises a constant radius R, the center of such radius being the longitudinal axis of shaft 38 (FIG. 4). The edge terminates at its trailing end at a slot 44, primarily employed for effecting a smooth transitional folding change prior to when a curved edge 45 of a trailing second finger means or portion 46 engages and folds trailing minor flap $F_4$. The radius of edge 45 is substantially greater than radius R as clearly illustrated in the drawings.

Figure 11:
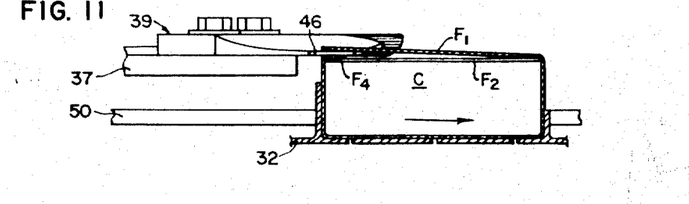

Referring to FIG. 11, it should be noted that finger 46 is preferably tapered toward its trailing end to permit cover flap $F_1$ to be superimposed over flaps $F_2$–$F_4$ to retain them thereunder prior to when finger 46 moves out of the confines of the carton. Conveyor 32 proceeds to move the cartons leftwardly in FIG. 3 with such cartons being guided on each side thereof by stationary bars 49 and 50. A stationary plow means or bar 51 (FIGS. 1 and 3) is arranged adjacent to and vertically above tuckers 37 to engage and fold cover flap $F_1$ over flaps $F_2$–$F_4$. The plow bar comprises a horizontally disposed extension 52 which partially extends into the sealing station to assure that flap $F_1$ is held down prior to its transfer into the sealing station.

With carton flaps $F_1$–$F_4$ superimposed, conveyor 32 proceeds to move the carton through sealing station 31 to secure the flaps together. The flaps are preferably adhesively treated when the carton blank is formed initially. The term "adhesive" as used herein should be understood to mean any preapplied fusible coating adapted to be activated by heat for sealing carton panels or flaps together. For example, such adhesive may constitute a heat sealable wax, polyethylene, polyvinylchloride or the like. The carton may constitute paperboard or any other suitable packaging material partially or totally coated with such an adhesive.

The sealing station comprises laterally spaced and vertically disposed parallel endless chains 60 and 61 or carrier means (FIG. 14) mounted in staggered relationship on a stationary frame 62 of the machine and on a respective side of the conveying means. The chains are arranged to form an endless carrier means for moving a respective U-shaped member or nozzle means 63, attached therebetween, into juxtaposed and substantial surrounding relationship with respect to three sides of each carton. Chain 60 is mounted on sprockets 64 and 65, secured to shafts 66 and 67, respectively. Chain 61 is mounted on sprockets 68 and 69 which are respectively secured to shafts 70 and 71 for rotation therewith. The drive input to such chains, suitably integrated into the overall drive system of the apparatus, will be hereinafter more specifically described.

Figure 13:
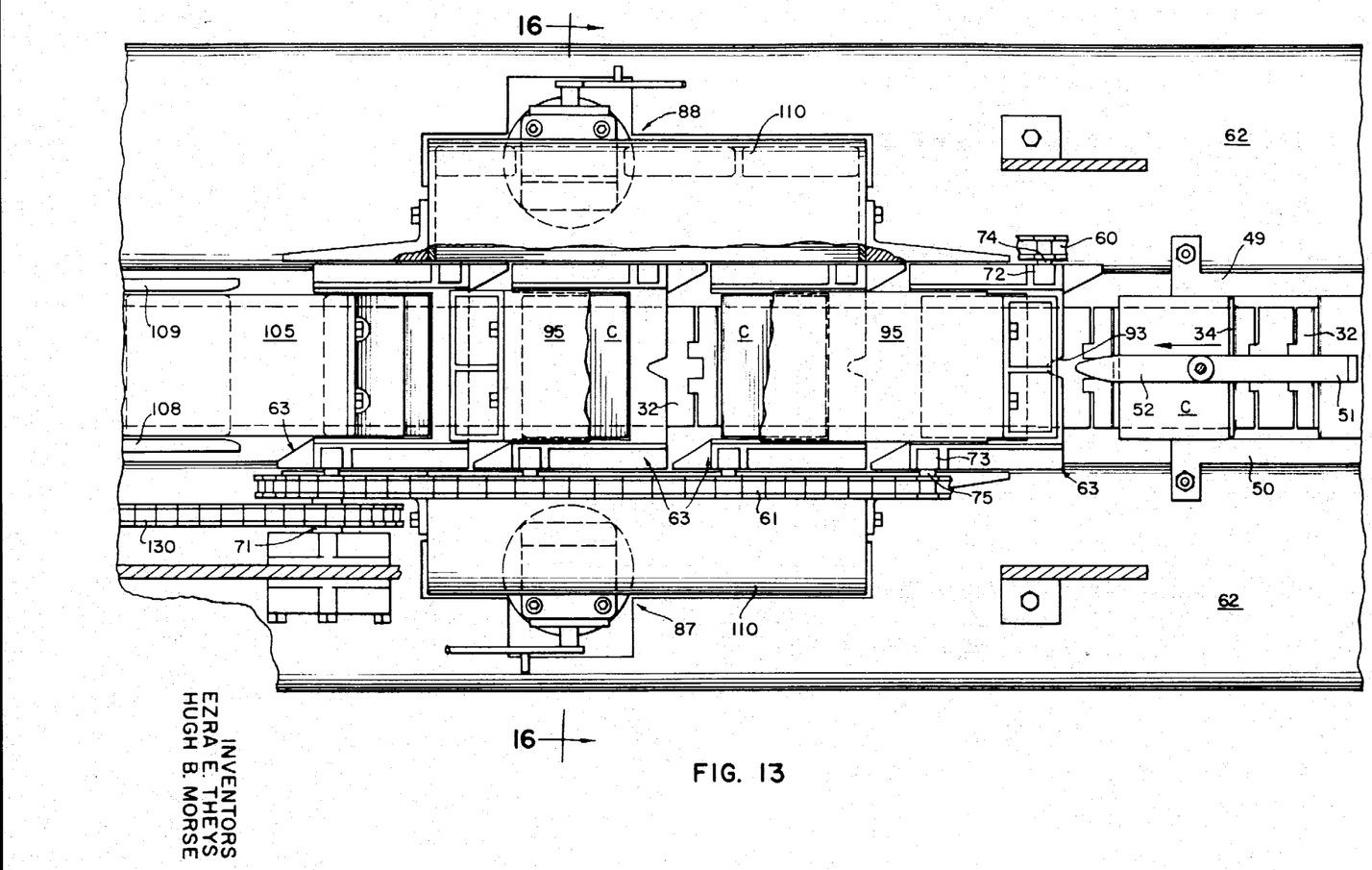
FIG. 13 is an enlarged, top plan view of a sealing station employed in the FIGS. 1 and 3 apparatus with parts broken-away for clarification purposes.
Figure 14:
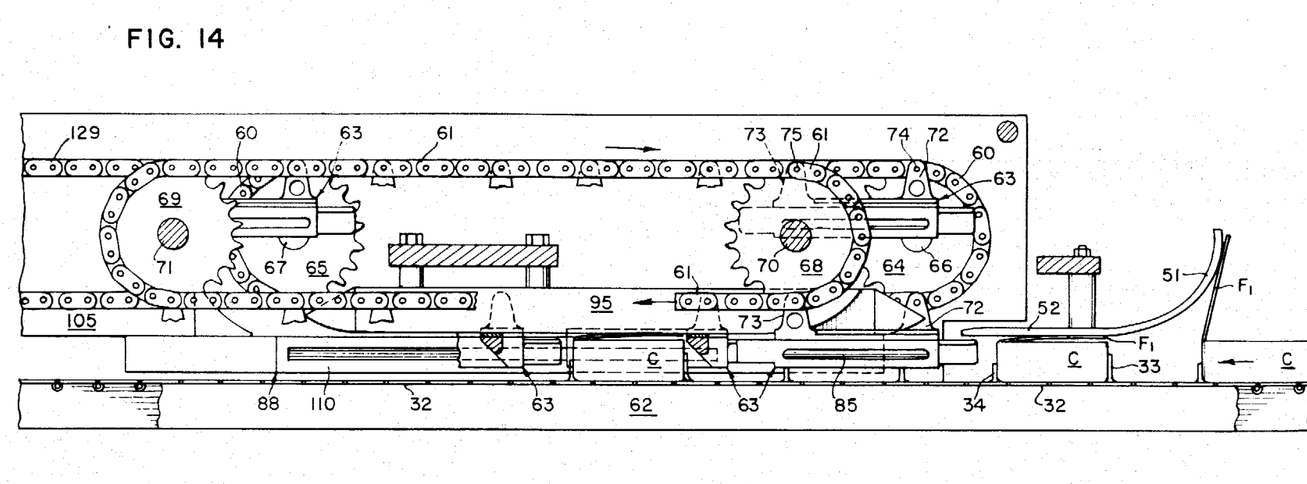
FIG. 14 is a side elevational view of the sealing station illustrated in FIG. 13 with parts broken-away for clarification purposes.
Figure 15:
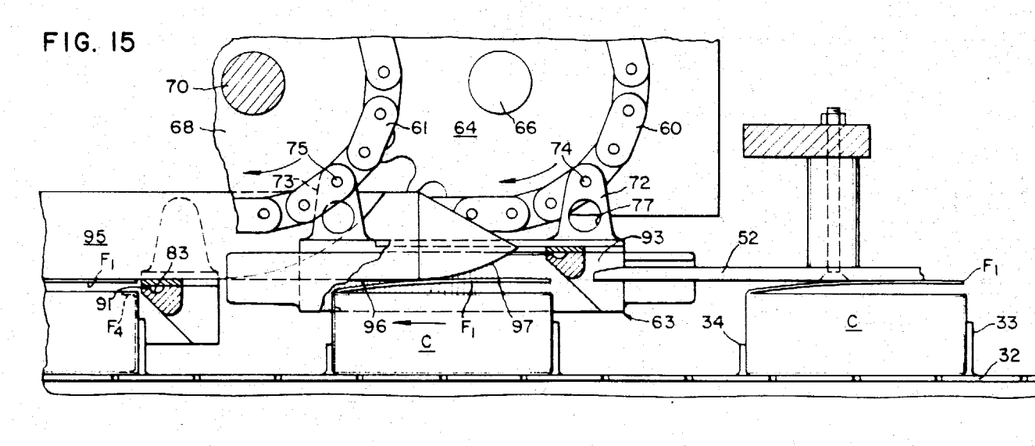
FIG. 15 is an enlarged, fragmentary view clearly illustrating the disposition of a portion of a chain drive shown in FIG. 14.
Figures 17, 18, 19:
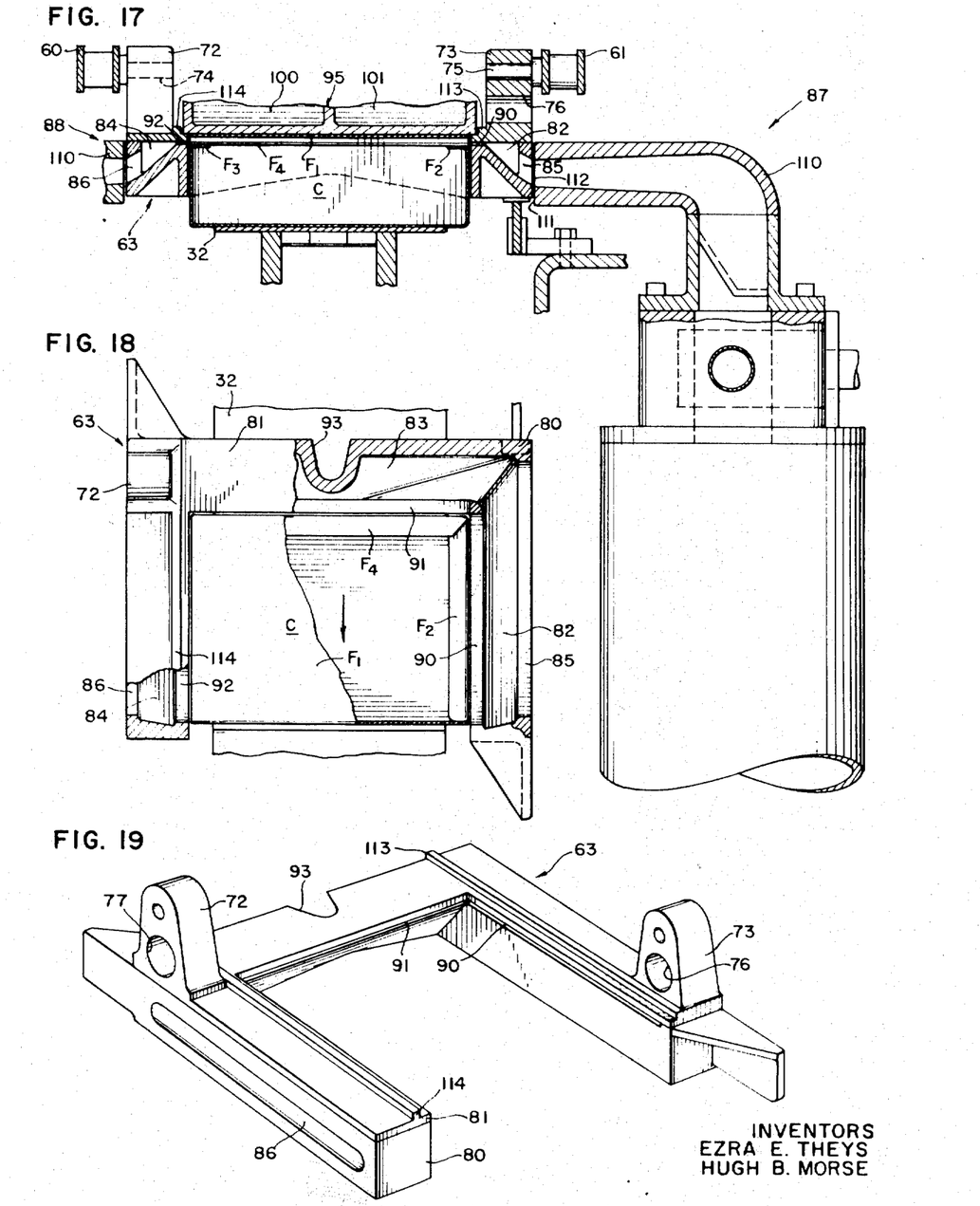
FIG. 17 is an enlarged, fragmentary view more clearly illustrating a portion of a sealing arrangement shown in FIG. 16.
FIG. 18 is a top plan view of a U-shaped nozzle means employed in the sealing station with portions thereof broken-away for clarification purposes.
FIG. 19 is an isometric view of the nozzle means.

As clearly illustrated in FIGS. 13–15, each shoe-like member or nozzle means 63 comprises upstanding and diametrically spaced lugs 72 and 73 pivotally mounted to chains or endless carrier means 60 and 61 by pivot pins 74 and 75, respectively. Lugs 72 and 73 may have apertures 76 and 77 formed therethrough, respectively, to prevent undue conduction of heat upwardly through the lugs. The chains are constructed and arranged to continuously maintain the members horizontal and to move them in a closed, semi-rectangular path, as noted by the transition of member 63 from its raised to its lowered position in FIG. 14. As shown in FIGS. 18 and 19, each shoe comprises a cast U-shaped member 80 having a matching U-shaped cover plate 81 suitably secured thereto by brazing or other suitable fabrication technique.

The cast member is substantially hollow to define intercommunicating chambers 82, 83 and 84 therein. Elongated openings or slots 85 and 86 are formed through opposite side walls of member 80 and defined in part by plate 81 to communicate with chambers 82 and 84, respectively. Stationary heater assemblies 87 and 88 (FIGS. 16 and 17) are each mounted on a respective side of the apparatus to communicate heated air through the slots. Member 80 and plate 81 further define elongated nozzles 90, 91 and 92 communicating with chambers 82, 83 and 84, respectively.

The nozzles in turn communicate heated air, maintained at a suitable temperature (e.g., 900° F.) and pressure (e.g., 5 p.s.i.), to the carton flaps to activate the adhesive pre-formed thereon. In an actual application the width or height of each nozzle approximated one-sixteenth of an inch. It should be noted in FIG. 15 that the trailing side of member 80 preferably has a vertically disposed slots 93 formed therein to provide a suitable clearance for the forward end of hold-down bar portion 52 (FIG. 15). In particular, such clearance is desirable when member 63 makes its descent into its substantial encircling position with respect to the carton.

As illustrated in FIGS. 14 and 15, a box-like housing 95 of a first cooling and flap positioning means is suitably secured to the frame of the machine and forms a horizontally disposed lower surface 96 thereon. Such surface is arranged to engage top flap $F_1$ to maintain it in its correct, spaced position (e.g., one-eighth of an inch) relative to the flaps $F_2$–$F_4$. The inherent resiliency of flap $F_1$ aids in maintaining it slightly spaced from flaps $F_2$–$F_4$ during the sealing operation.

Nozzles 90–92 are arranged slightly lower than surface 96 (FIG. 17) to discharge heated air onto and between the opposed flaps. A forward end 97 of the housing may be tapered upwardly in the manner shown to facilitate reception of the carton thereunder. Thus, it can be seen that the carton will experience a smooth transition from the folding station to the sealing station with flap $F_1$ being smoothly moved from the under-surface of hold-on bar portion 52 to co-planar surface 96 of housing 95.

Housing 95 of the cooling means preferably comprises chambers 100 and 101 (FIG. 16) adapted to continuously circulate a cooling fluid therethrough, such as water maintained at approximately 50° F. The cooling fluid may be circulated through the chambers by a closed circulating system comprising suitable pump and cooling means (not shown) and inlet means 102 and outlet means 103 (FIG. 3), for example. The cooling means primarily functions to prevent overheating, scorching or marking of the carton by providing a suitable "heat sink" over the entire top surface of cover flap $F_1$ during sealing.

A second cooling or flap closing means, substantially identical to the first cooling means, comprises a housing 105 aligned with housing 95 to receive the cartons thereunder. The second cooling means comprises a horizontally disposed lower surface 106 vertically arranged slightly lower (e.g., one-eighth of an inch) than surface 96 of the first cooling means. In particular, surface 106 functions to cool and to fully compress and seal cover flap $F_1$ to flaps $F_2$–$F_4$ to form a tightly sealed closure. Housing 105 also forms suitable circulating chambers therein (not shown) which may have cool water circulated therethrough from an inlet 107 (FIG 3) to a suitable outlet of the cooling system. Side compression and cooling bars 108 and 109 may be suitably connected to such inlet and outlet and arranged on opposite sides of the carton to aid in "squaring" the cartons and for further cooling the sealed areas.

Returning to FIG. 17, each heating means 87 and 89 may comprise a heater and attendant constructions similar to those disclosed in U.S. patent application Ser. No. 735,000, filed on June 6, 1968, by George Schafer et al. for "Apparatus and Method for Forming Cartons." In particular, each heater may comprise a tubular manifold 110 secured to a casing having vertically disposed electrical heating coils (not shown) suitably disposed in chambers thereof. Ambient air, maintained at a suitable pressure, passes by and around the coils to be heated to a predetermined temperature prior to when it is discharged from nozzle 110 and through elongated opening 85.

It should be noted that the flat, front surface 112 of manifold 110 (FIG. 17) and juxtaposed surface 113 of the nozzle means are in substantial bearing and sliding contact to prevent heated air from escaping thereby and to aid in laterally positioning the nozzle means. In addition, housing 95 preferably extends laterally a slight distance to overlie a recessed, top edge portion of the nozzle means to provide means for aiding in the correct positioning of the nozzle means during its air discharging function. In addition, parallel ribs 113 and 114 are preferably formed on cover plate 81 (FIG. 19) to aid in laterally positioning the nozzle means relative to housing 95 and cartons C. Such ribs further function to aid in preventing heated air from escaping between the housing and nozzle means when it is discharged out of nozzles 90 and 92.

The integrated drive means for driving the various components of the above-described apparatus will now be described. Referring to FIG. 1, a main electrical drive motor 115 has an output shaft 116 adapted to selectively drive a sprocket 117. The sprocket in turn drives an endless chain 118 and sprocket 119 to impart movement to conveyor means or belt 32 via a shaft 120 and drive sprocket 121. A first spur gear 122 (FIG. 3) is secured to shaft 120 and meshes with a second spur gear 123 to drive a shaft 124. Shaft 124 has a sprocket 125 secured thereto which in turn drives an endless chain 126 to impart rotation to a sprocket 127.

The latter sprocket is secured to a shaft 128 which in turn functions to drive endless chains 129 and 130 via suitably arranged sprockets (not shown). The latter two chains are operatively connected to shafts 67 and 71 by sprockets 65 and 69, respectively, to simultaneously drive chains 60 and 61.

Conveyor 32 is mounted on sprocket 121 and a second idler sprocket 131, the latter sprocket being secured to a horizontally disposed shaft 132. The shaft rotates with sprocket 131 to drive a sprocket 133, chain 134, and sprocket 135 to impart rotation to a shaft 136. The latter shaft is operatively connected to shaft 38 of folding means 35 and 36 by suitable drive mechanisms 137 and 138, illustrated in FIG. 5.

Figure 16:
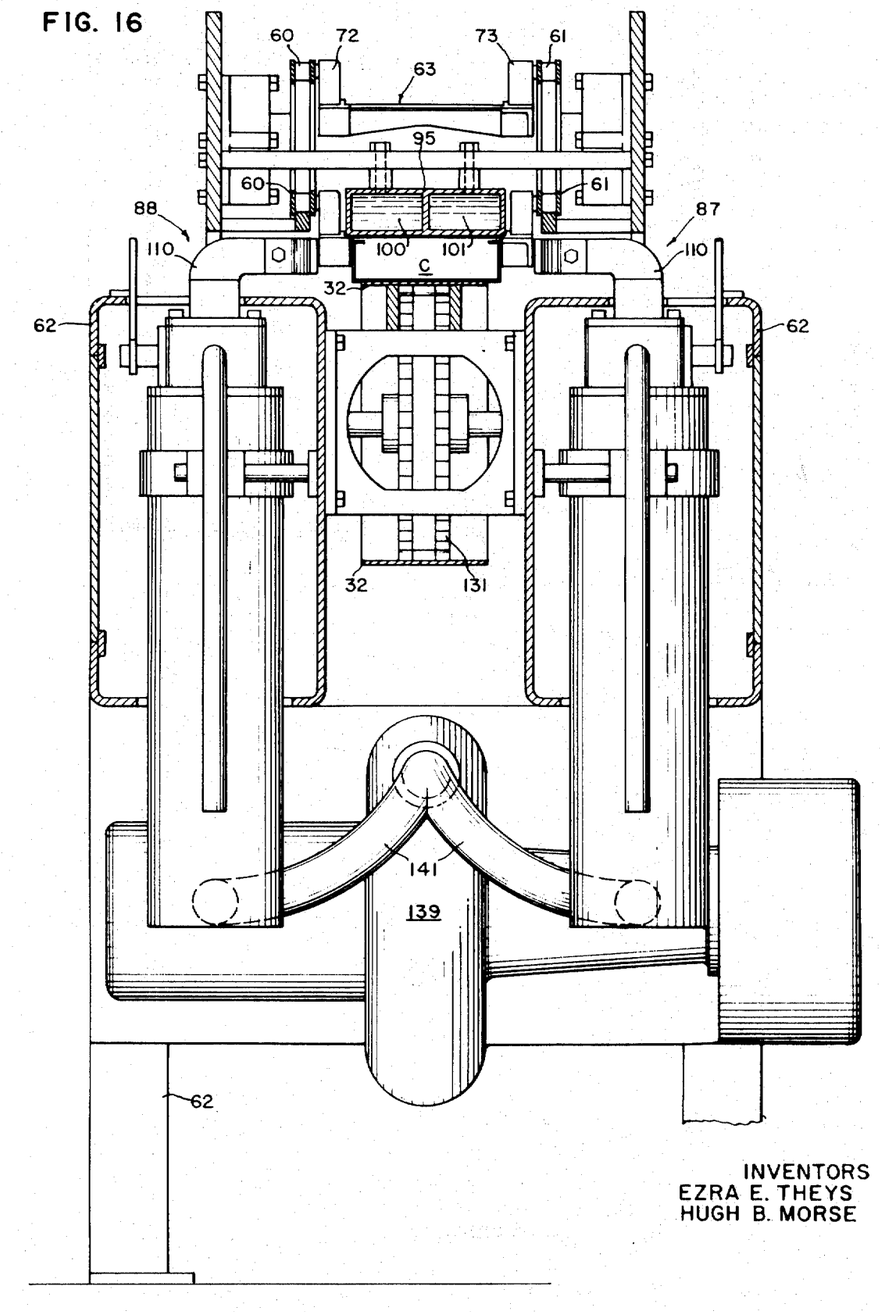
FIG. 16 is a cross-sectional view of the sealing station, taken in the direction of arrows 16—16 in FIG. 13.

As further illustrated in FIG. 1, a blower 139 of the positive displacement type may have its shaft 140 suitably integrated into the above-described drive system to rotate the blower's vaned rotor (not shown). Such actuation will communicate pressurized air through branch conduits 141 which are connected at their other ends to above-described heater assemblies 87 and 89 (FIG. 16). From the above description it can be seen that all moving parts employed in the apparatus are suitably integrated to perform all operations in a synchronized manner.

FIGS. 20–24 illustrate a modified folding and sealing means embodiment wherein the folding and sealing stations are at the same location. The two embodiments employ common numerals to depict constructions and arrangements exhibiting substantially identical functions with the FIGS. 20–24 numerals being accompanied by a subscript $a$. It should be further understood that the type of conveying and final sealing means employed in the first described embodiment may also be utilized in conjunction with the embodiment now to be described.

Figure 20:
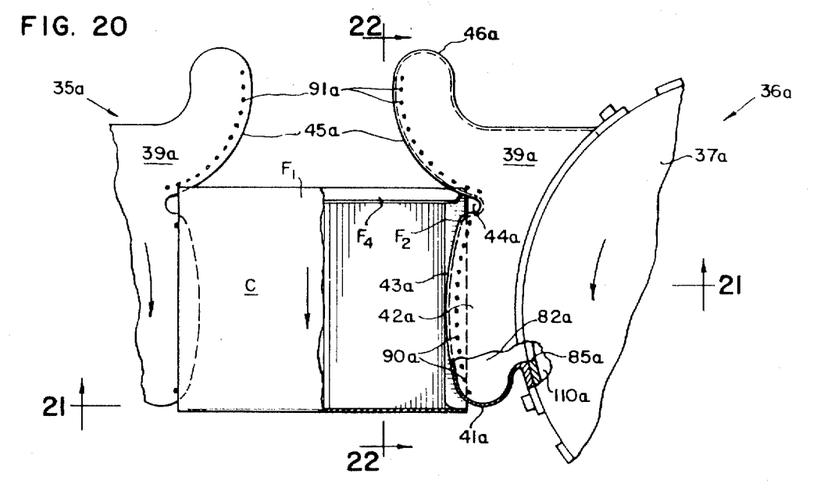
FIG. 20 is a partially sectioned top plan view of a modified folding and sealing means.
Figure 21:
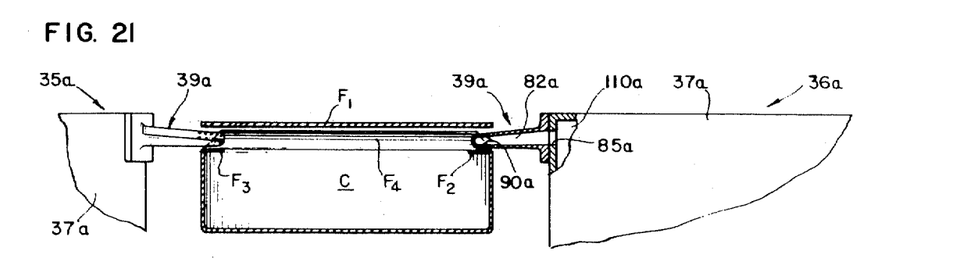
FIG. 21 is a sectional view taken in the direction of arrows 21—21 in FIG. 20.
Figures 22, 23, 24:
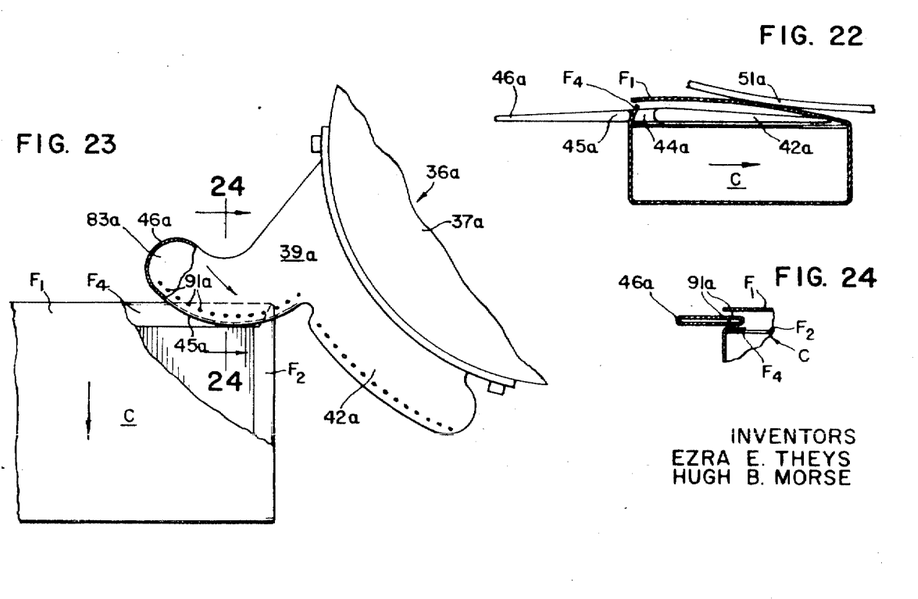
FIG. 22 is a sectional view taken in the direction of arrows 22—22 in FIG. 20.
FIG. 23 is a top elevational view of the FIG. 20 folding and sealing means in an advanced stage of operation.
FIG. 24 is a sectional view taken in the direction of arrows 24—24 in FIG. 23.

Cartons C are continuously conveyed through the consolidated folding and sealing stations illustrated in FIG. 20 by suitable conveying means. Folding and sealing assemblies 36$a$ and 37$a$ are substantially identical and therefore only assembly 36$a$ will be described in detail. Such assembly comprises a cylindrical drum 37$a$ adapted to be rotated about a vertically disposed axis thereof by drive means suitably integrated into the overall drive system for the apparatus.

A plurality of folding members or means 39$a$ (one shown) are secured on the periphery of the drum assembly to fold flaps $F_1$–$F_4$ into juxtaposed relationship. As will be hereinafter explained each member 39$a$ further functions as a nozzle means for discharging a heated fluid onto the carton flaps for sealing purposes.

Member 39$a$ comprises a rounded leading first finger means or portion 41$a$ connected to an arcuate portion 42$a$. Edge 43$a$ of portion 42$a$ preferably comprises a constant radius, the center of such radius being the longitudinal axis of drum assembly 37$a$. The edge terminates at its trailing end at a slot 44$a$ primarily employed for effecting a smooth transitional folding charge prior to when a curved edge 45$a$ of a trailing second finger means or portion 46$a$ engages and folds trailing minor flap $F_4$.

A stationary plow means or bar 51$a$ (FIG. 22) is arranged to engage and fold flap $F_1$ over flaps $F_2$–$F_4$. Such bar may be constructed and arranged similar to bar 51 of the first described embodiment to guide the carton to the final compression and sealing means or may comprise such means itself. As described above the flaps are preferably adhesively treated when the carton blank is formed initially to permit a heated fluid to be discharged thereon for sealing purposes.

Member 39a is preferably cast to be substantially hollow to define inter-communicating chambers 82a and 83a therein. An arcuate opening or slot 85a is formed in member 39a to communicate with chamber 82a. Drum assembly 37a may have a large chamber 110a (FIG. 20) formed therein to communicate heated air to slot 85a. The heated air may be communicated to chamber 110a in any conventional manner such as by the type of heating assembly 87 employed in the first described embodiment.

Thus it can be seen that the folding and sealing operations are performed substantially simultaneously in contrast to the somewhat delayed and sequential folding and sealing steps employed in the first described apparatus. The linear or surface speed of the finger means is preferably substantially equal to the linear speed of the conveying means to assure complete activation of the flap's adhesive by the nozzle means and to eliminate carton drag. As stated above the carton may be then passed under a stationary compression means such as a plow bar to fully compress flap $F_1$ over flaps $F_2$–$F_4$.

It can be seen that both of the above described embodiments are adapted to perform a method for sealing at least two adhesively treated carton flaps together. The method may generally comprise the steps of: conveying carton C along a path; folding the flaps into substantially superimposed and spaced relationship; moving a nozzle means along said path and simultaneously maintaining said nozzle means adjacent to said carton flaps; discharging a heated fluid onto the carton flaps to activate the adhesive thereon; and compressing and sealing the flaps together.

What is claimed is:

1. In an apparatus comprising conveying means for moving a carton along a linear path and folding means for folding and superimposing at least portions of upstanding first and second flaps, said first flap hingedly connected to said carton by a first scoreline disposed in the direction of said linear path and said second flap hingedly connected to said carton by a second scoreline disposed perpendicularly relative to said first scoreline, said folding means comprising a horizontally disposed tucker means mounted for rotation about a vertically disposed axis thereof adjacent to said conveying means, said tucker means having a first finger means for gradually engaging and folding said first flap laterally inwardly toward said linear path by moving substantially in the direction of said first scoreline and progressively along said first flap and a second finger means for gradually engaging and folding said second flap into superimposed position over at least a portion of said first flap by moving substantially in the direction of said second scoreline and progressively along said second flap, the radius of said second finger means being substantially greater than the radius of said first finger means with each of said radii being centered at the vertically disposed axis of said tucker means.

2. The invention of claim 1 wherein said tucker means further comprises notch means formed between said first and second finger means for permitting said second finger means to initiate its folding of said second flap at said notch means.

3. The invention of claim 1 further comprising means for adjustably mounting said first and second finger means on the periphery of said tucker means.

4. The invention of claim 1 wherein said tucker means comprises a tucker wheel having a plurality of said first and second finger means mounted on the periphery thereof.

References Cited

UNITED STATES PATENTS

| | | | |
|---|---|---|---|
| 3,187,646 | 6/1965 | Monroe | 93—44.1 GT |
| 3,389,645 | 6/1968 | Winters | 93—44 |
| 3,398,659 | 8/1968 | Egleston | 93—44.1 |
| 3,405,611 | 10/1968 | Millich | 93—49 M |
| 3,451,194 | 6/1969 | Nerenberg | 93—44 X |
| 3,461,642 | 8/1969 | Langen | 93—44 X |
| 3,529,515 | 9/1970 | Lang | 93—84 R |
| 3,533,332 | 10/1970 | Young | 93—44.1 X |
| 3,537,361 | 11/1970 | Derderian | 93—84 TW |

WAYNE A. MORSE, JR., Primary Examiner

U.S. Cl. X.R.

93—44, 59 R, 84 R, 84 TW